Jan. 6, 1942.   G. C. FIELDS   2,269,259
MIXING DEVICE
Filed Feb. 1, 1939
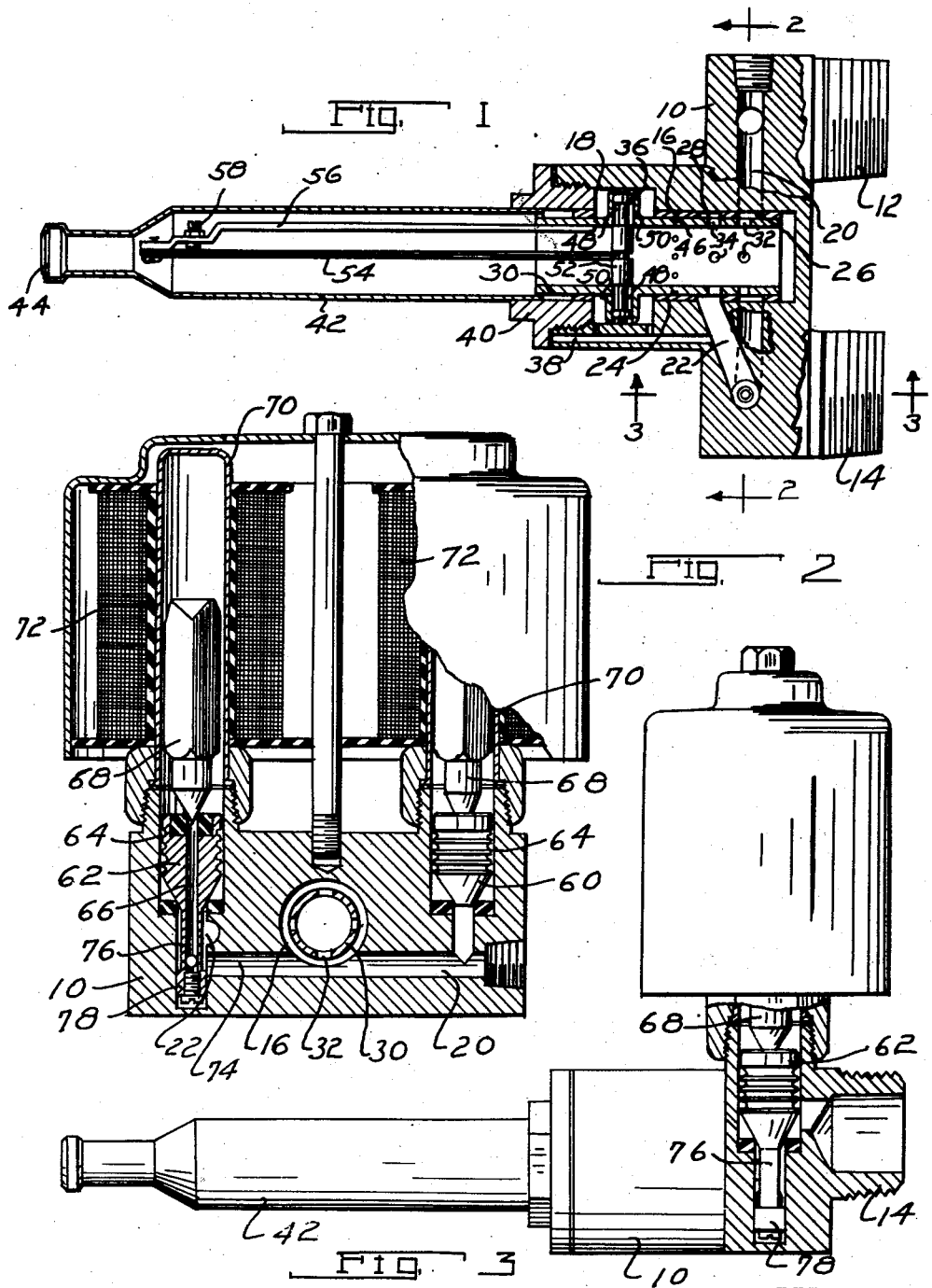
INVENTOR.
GEORGE C. FIELDS
BY McConkey Dawson & Booth
ATTORNEYS Patented Jan. 6, 1942

2,269,259

UNITED STATES PATENT OFFICE 2,269,259

MIXING DEVICE

George C. Fields, South Bend, Ind., assignor to Bendix Home Appliances, Inc., South Bend, Ind., a corporation of Delaware Application February 1, 1939, Serial No. 254,126

9 Claims. (Cl. 236—12)

This invention relates to mixing devices and more particularly to devices for mixing hot and cold fluids to obtain a mixture having a predetermined temperature.

One of the objects of the invention is to provide a mixing device in which a control member for the fluids to be mixed is operated by power means in response to a characteristic of the mixed fluids. According to one desirable feature the power means and the controls therefor are carried by the control member to form a unit which may be mounted bodily in or removed bodily from the assembled mixing device.

Another object of the invention is to provide a mixing device which may deliver a mixture of a plurality of fluids or which may deliver only one fluid. This is preferably effected by providing shut-off valves for the fluids with a by-pass from one of the valves around another thereof.

Another object of the invention is to provide a mixing device including novel pressure-operated shut-off valves. Preferably the valves may be controlled remotely as through magnetic means.

According to one important feature one of the shut-off valves includes a part to close the by-pass referred to above to prevent undesired mixing of the fluids in the event of variations in the supply pressures. In the preferred form the shut-off valves are slidable piston type valves one of which is provided with an extension controlling the by-pass.

Other objects, advantages and novel features of the invention will be apparent from the following description of the embodiment shown in the accompanying drawing in which:

Figure 1 is a horizontal section through a mixing device embodying the invention;

Figure 2 is a section on the line 2—2 of Figure 1 with parts in elevation; and

Figure 3 is a side elevation with parts in section substantially on the line 3—3 of Figure 1.

The mixing device as shown comprises a body portion 10 which may be a casting and which is provided with inlet nipples 12 and 14 for connection with suitable sources of hot and cold water respectively. The body is further formed with a cylindrical bore 16 and an enlarged cylindrical portion 18 and with passages 20 and 22 connecting the inlet nipples respectively with the bore 16 at points axially spaced along said bore.

The bore 16 is fitted with a sleeve 24 having a pair of annular ports 26 and 28 communicating with the passages 20 and 22 respectively. A tubular sleeve 30 is slidably mounted in the sleeve 24 and is formed with spaced sets of ports 32 and 34 adapted to register respectively with the annular ports 26 and 28. It will be noted from Figure 1 that when the sleeve 30 is in its center position as shown, ports 32 and 34 are fully open while movement of the sleeve in either direction will restrict one set of the ports without affecting the other set.

The sleeve 30 is moved by power means shown as comprising an annular piston 36 carried by the sleeve and fitting in the enlarged bore 18. Actuating fluid is supplied to the piston through a passage 38 formed in the body 10 and connecting the passage 22 to the bore 18 on opposite sides of the piston. The end of bore 18 and of the passage 38 are both closed by a gland 40 screw-threaded into the end of the bore and fitting on the end of the passage 38. The gland 40 carries a tubular chamber 42 communicating with the interior of member 30 and having an open end 44 through which the mixed fluids are discharged.

The member 30 has a sliding seat in the sleeve 24 and in the gland 40 and there may be leakage around the member 30 into the tube 42 from the left of the piston 36 as seen in Figure 1. In order to balance the effect of such leakage, the member 30 is provided with an annular groove 46 to the right of the piston communicating through suitable ports with the interior of the tubular member. Thus any tendency for leakage around the tubular member is equalized on the opposite sides of the piston so that no unbalanced pressure effect is created.

In order to control the power means and the control member 30, the piston 36 is preferably provided with a pair of diametrically opposite bores 48 having ports 50 communicating respectively with the opposite sides of the piston. A valve member 52 is slidably mounted in the bores 48 and has an enlarged center portion adapted to move into and out of the bores variably to restrict the flow of fluid from one side or the other of the piston into the mixing chamber.

The valve 52 is controlled by a bi-metal strip 54 extending substantially throughout the length of the tubular mixing chamber 42. At one end the strip 54 fits into a groove in the valve 52 and at its opposite end it is secured to a bracket 56 which is mounted on the tubular member 30. An adjusting screw 58 is preferably provided in the bracket to vary the tension on the strip thereby to vary the temperature of the mixed fluids.

In operation of the device with hot and cold water flowing into the nipples 12 and 14 and through the passages 20 and 22 respectively, the water enters through the ports 32 and 34 and the mixture flows out along the bi-metal strip 54 through the mixing chamber 42 and the discharge opening 44. If the temperature of the mixed water is that for which the strip is adjusted, the valve 52 will be centered as shown closing or restricting both bores 48 equally so that the pressure on the opposite sides of the piston 36 will be balanced. If the mixture becomes too hot, the strip 54 will deflect upwardly opening the lower passage 48 and simultaneously restricting the upper passage. This reduces the pressure on the left side of the piston 36 so that the piston moves to the left partially cutting off the ports 32 and restricting the amount of hot water entering the mixing chamber. When the mixture again reaches the right temperature, the strip 54 will center the valve 52 again equalizing the pressure on opposite sides of piston 36 so that the piston and the control member 30 will remain stationary. In the event the mixture becomes too cold, the operation described above will be reversed to move the piston and control member to the right restricting the cold water ports 34.

In order to shut off the supply of water completely, the passages 20 and 22 are provided with suitable shut off valves shown as comprising pistons 60 and 62 fitting on suitable valve seats in the passages 20 and 22 respectively. The pistons 60 and 62 fit loosely in cylindrical bores 64 in the body 10 and are arranged so that incoming fluid is supplied to their lower portions as best seen in Figure 3. Each of the pistons is provided with a center bore 66 extending from its upper surface to its lower surface and providing a bi-pass through the piston.

When the bores 66 are closed as hereinafter described, fluid from the inlet nipples leaks around the pistons to equalize the pressures on the upper and lower sides thereof so that the pistons move down to their seats closing the passages. When the bores 66 are open, fluid from the upper side of the pistons flows therethrough to relieve the pressure and the pistons move up under the influence of the unbalanced pressure on their lower surfaces to open the inlet passages.

The pistons are controlled in the embodiment shown by valve members 68 having pointed ends adapted to fit on the bores 66. The valve members 68 are slidable in tube 70 around which suitable solenoids 72 are arranged. The solenoids 72 may be individually controlled from a remote point either manually or through suitable automatic control mechanism to cut off the supply of water when desired. When the solenoids are energized, the valve members 68 will be raised to open the passages 66 resulting in opening of the piston valves as described above. When the solenoids are deenergized, the valve members 68 will drop by gravity to the position shown to close the bores 66 so that the piston valves will be closed.

It may be desirable under some circumstances to supply one of the fluids alone rather than a mixture thereof. In the embodiment shown provisions are made for supplying hot water only though it will be understood that by reversing the connections, cold water only could be supplied if desired. Since opening of the hot water valve by itself might result in a deflection of the bimetal strip such as to close the hot water inlet ports 32, a by-pass is provided through which hot water may be supplied through the cold water inlet ports 34. As shown the by-pass includes an extension 74 of the passage 20 communicating with the passage 22. When the hot water valve 60 is open, hot water may flow through this by-pass into the cold water inlet passage 22 so that hot water alone will be supplied to the mixing device.

In order to close the by-pass when it is desired to supply a mixture of hot and cold water the valve 62 is formed with an extension 76 having an enlarged end portion 78 adapted to close the by-pass 74 when the valve 62 is opened. As best seen in Figure 2, raising of the valve 62 brings the portion 78 into register with the by-pass 74 while lowering of the valve 62 to its closed position moves the portion 78 out of register with the bypass to establish communication between the bypass and the inlet passage 22.

The mixing device described above is particularly adapted for use with an automatic washing machine to control the temperature of the water supplied thereto. It will be apparent, however, that this device might equally well be applied to control the temperature of other mixed fluids or that by substituting suitable sensitive elements for the thermostat 54, it might control other characteristics of mixtures. It is therefore not intended to limit the scope of the invention to the exact structure illustrated and described nor otherwise than by the terms of the appended claims.

What is claimed is:

1. A mixing device comprising a body formed with inlet ports for a plurality of fluids to be mixed, a control member movably mounted in the body for controlling the relative areas of said ports, a piston carried by said control member, means for conducting fluid under pressure from one of said inlet ports to both sides of said piston, a bleed valve carried by said member for relieving the pressure from either side of said piston, and means carried by said member and sensitive to a characteristic of the mixed fluids for controlling the bleed valve.

2. A mixing device for hot and cold fluids comprising a body formed with inlet ports for hot and cold fluids to be mixed, a control member movably mounted in the body for controlling the relative areas of said ports, a piston carried by said control member, means for conducting fluid under pressure from one of said inlet ports to both sides of said piston, a bleed valve carried by said member for relieving the pressure from either side of said piston, and a thermostat carried by said member and sensitive to the temperature of the mixed fluids for controlling the bleed valve.

3. A mixing device for hot and cold fluids comprising a body formed with inlet ports for hot and cold fluids to be mixed, a control member movably mounted in the body for controlling the relative areas of said ports, a piston carried by said control member, means for conducting fluid under pressure from one of said inlet ports to both sides of said piston, the opposite sides of said piston being formed with bleed ports, a bleed valve movable radially of the piston to control said bleed ports, and a bimetal strip carried by said control member and connected to said bleed valve to move it.

4. A mixing device for hot and cold fluids comprising a body formed with a bore therein and having inlet ports for hot and cold fluids communicating with said bore, a tubular member slidable in said bore and having openings communicating with said ports to control the relative port areas, an annular piston secured to said tubular member, means for conducting fluid from one of said inlets to both sides of said piston to provide operating fluid therefor, said piston having bleed ports from its opposite sides communicating with the interior of said tubular member, means for controlling the bleeding of fluid through said ports to reduce the pressure on one side or the other of said piston, and means responsive to the temperature of the mixed fluids to control said valve means.

5. A mixing device for hot and cold fluids comprising a body formed with a bore therein and having inlet ports for hot and cold fluids communicating with said bore, a tubular member slidable in said bore and having openings communicating with said ports to control the relative port areas, an annular piston secured to said tubular member, means for conducting fluid from one of said inlets to both sides of said piston, said piston having bleed ports from its opposite sides communicating with the tubular member, a valve carried by the tubular member and controlling said bleed ports, and a thermostat carried by the tubular member and responsive to the temperature of the mixed fluids for controlling said valve.

6. A mixing device for hot and cold fluids comprising a body formed with a bore therein and having inlet ports for hot and cold fluids communicating with said bore, a tubular member slidable in said bore and having openings communicating with said ports to control the relative port areas, an annular piston secured to said tubular member, means for conducting fluid from one of said inlets to both sides of said piston, said piston having bleed ports from its opposite sides communicating with the tubular member, a valve carried by the tubular member and controlling said bleed ports, an elongated bracket carried by the tubular member, and a bimetal strip secured at one end to the bracket and at its other end to said valve to move the valve in accordance with the temperature of the mixed fluid.

7. A mixing device comprising a body formed with inlet passages for a plurality of fluids to be mixed and with a mixing chamber having ports connecting it to the inlet passages, means responsive to a characteristic of the mixed fluids to control the relative areas of said ports, valves in the body controlling said inlet passages, and a by-pass from one of said inlet passages to the port connected to the other inlet passage whereby only one fluid may be supplied if desired, the valve in said other inlet passage including a part to close said by-pass when the valve is opened.

8. A mixing device comprising a body formed with inlet passages for a plurality of fluids to be mixed and with a mixing chamber having ports connecting it to the inlet passages, means responsive to a characteristic of the mixed fluids to control the relative areas of said ports, a slidably mounted shut-off valve in each of said inlet passages, a by-pass between said passages posterior to the shut-off valves, and an extension on one of said valves to close said by-pass when said one valve is open.

9. A mixing device comprising a body formed with inlet passages for a plurality of fluids to be mixed and with a mixing chamber having ports connecting it to the inlet passages, means responsive to a characteristic of the mixed fluids to control the relative areas of said ports, piston shut-off valves in said passages operated by the pressure of the fluid, magnetic means operable from a remote point to control the shut-off valves, a by-pass between the inlet passages posterior to the valves, and an extension on one of the shut-off valves to control the by-pass.

GEORGE C. FIELDS.